J. H. HEDMARK.
VALVE.
APPLICATION FILED FEB. 19, 1914.
1,244,604.
Patented Oct. 30, 1917.
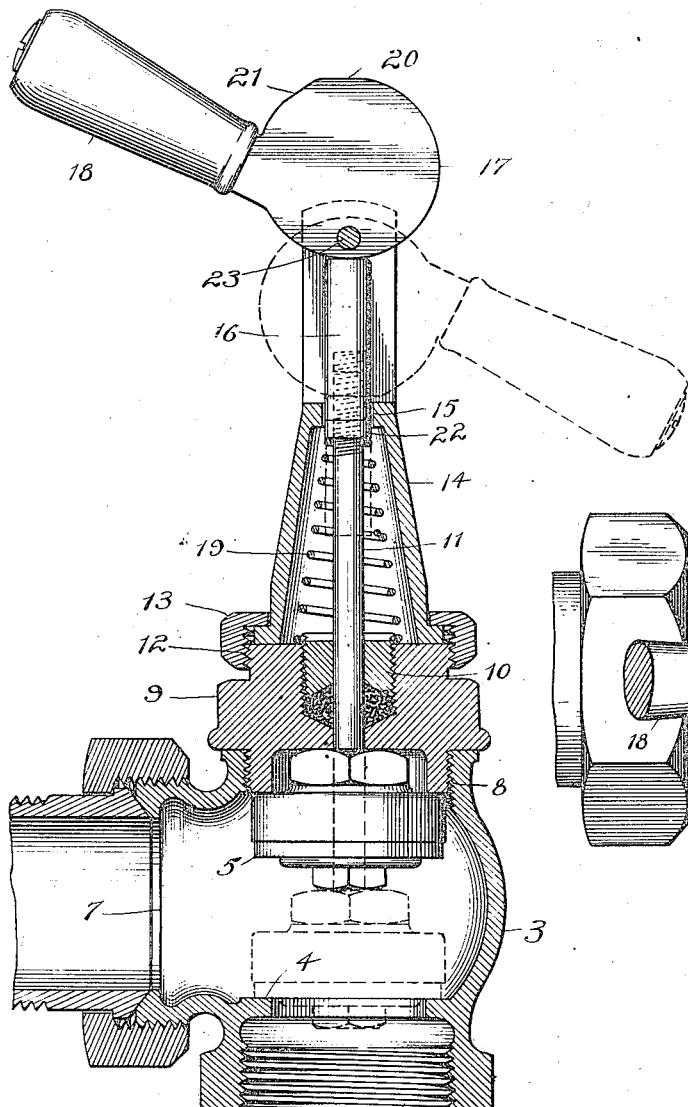
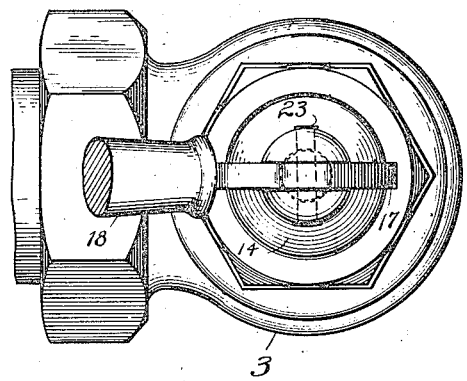
Witnesses:
R. L. Farmington
Irene Forrest
Inventor
Joseph H. Hedmark,
By Glenn S. Noble
Atty.

UNITED STATES PATENT OFFICE.

JOSEPH H. HEDMARK, OF CHICAGO, ILLINOIS.

VALVE.

1,244,604.

Specification of Letters Patent.

Patented Oct. 30, 1917.

Application filed February 19, 1914. Serial No. 819,688.

*To all whom it may concern:*

Be it known that I, JOSEPH H. HEDMARK, a citizen of the United States, residing at Chicago, in the county of Cook and State of Illinois, have invented certain new and useful Improvements in Valves, of which the following is a specification.

In steam heating systems, it has been the common practice to use valves for the radiators with screw stems, whereby they are opened and closed by turning a handle, and may be left partly open if desired. A common objection to such valves is that, when left partly open, there is apt to be a large amount of condensation in the radiators, which interferes with the proper working of the system. Another objection is that the turning of the screw to open a valve is a comparatively slow process and frequently requires considerable strength in order to fully close the valve.

Among the objects of the present invention are to provide a valve which may be easily opened or closed; which must be either fully opened or fully closed; which is provided with means tending to fully open the same after the opening movement is started; to improve the general construction of such valves, and to provide such advantages as will be more fully set forth hereinafter.

In the accompanying drawings illustrating one form of my invention:

Figure 1 is a longitudinal sectional view; and,

Fig. 2 is a top view.

In accordance with my invention the valve body 3 is provided with the usual seat 4 which coacts with the disk 5, such seat and disk being made in any desirable form. The body 3 is provided with an inlet 6 and outlet 7 which are threaded in the usual manner for connection with pipes. The body 3 is also provided with an opening 8 in alinement with the inlet 6, which is threaded to receive a top or cap 9, which is provided with a packing 10 for the valve rod or stem 11, which rod is connected with the disk 5 and passes up through the top 9. A portion of the outer periphery of the top 9 is suitably shaped for engagement with a wrench, and the upper end thereof is threaded at 12 for engagement with a locking nut 13, which nut is flanged to engage with the lower flanged end of a tubular extension 14 which is provided at its upper end with a bearing 15 for the upper enlarged end 16 of the rod or stem 11. The upper end of the extension or bearing 14 is slotted to receive an eccentric or cam 17 which is mounted on a transverse pivot or pin 23, which pin is substantially in alinement with the center of the stem 11. The cam 17 is provided with a handle 18 whereby it may be readily swung on its pivot. A spring 19 is inserted between the lower end of the enlarged portion 16 of the valve stem, and the upper face of the top 9. In order to make this spring as strong as possible and to confine it within a limited space longitudinally, it is preferably made in the form of a conical spiral as indicated.

When the valve is to be closed, the operator swings the handle 18 over and presses it down to the position shown in dotted lines in Fig. 1, which causes the cam to press the stem 11 down against the tension of the spring 19 and closes the disk 5 against the seat 4. In order that the valve will remain closed when the eccentric or cam 17 is in the position indicated, the face of the cam is flattened as indicated at 20, such flattened portion being in engagement with the top of the stem when the valve is closed. In order to provide for wear, or a limited amount of compression of the disk member, a plurality of such flat surfaces may be provided at different distances from the axis of rotation of the cam, another of such surfaces being indicated at 21 which is on a slightly longer radius than the surface 20 and after the valve has become slightly worn, the handle may be pressed farther down until the surface 21 engages with the end of the valve stem. A further adjustment may be obtained by threading the upper end of the rod 11 for engagement with a threaded hole in the extension 16 and providing a locknut 22 whereby the valve stem may be lengthened or shortened by adjusting the extension 16. When the valve is to be opened, the operator merely raises up on the handle 18 until the flat surface 20 passes beyond the end of the valve stem, when the spring 19 acting on the valve stem will cause the stem to swing the cam and handle upwardly to the position shown in full lines in Fig. 1. If there is any pressure against the disk 5, which will ordinarily be the case, such pressure assists in opening the valve and it will be impossible to leave the valve in partially opened position. It will also be noted that the connection of the tubular extension or bearing 14 is such that this bearing may be turned so as to bring the handle to any desired position in a horizontal plane for convenience in operating the same. When the valve is in full open position, the top of the disk 5 may be arranged to engage with the lower face of the top 9 so as to make an additional closure to prevent leakage through the top past the valve stem.

From this description it will be readily seen that my improved valve forms an exceedingly quick opening and closing one and will insure the full opening or complete closing of the valve whenever it is operated.

Having thus described my invention, which, it will be noted may be readily changed for different conditions, what I claim and desire to secure by Letters Patent is:

1. In a valve, a casing having an opening therethrough, a valve seat in said opening, a valve plug adapted to co-act with said seat, a stem connected with said plug and extending outwardly through the casing, said stem having a shoulder thereon, a spring interposed between the shoulder and the casing, tending to raise the stem to hold the valve in open position, a bearing for said stem projecting from said casing, ears extending upwardly from said bearing, and a disk eccentrically mounted in said ears and having its edge engaging with the top of the stem, said disk having its edge farthest from its fulcrum flattened to enable said valve to be locked in closed position.

2. The combination of a valve body having a seat therein, a disk, a stem for operating said disk, a top having a hole therethrough for the stem, a bearing member extending from said top, and having a bearing at its upper end for the stem, a cam pivotally mounted in said bearing member and engaging with the valve stem, a handle for said cam, and a spring engaging with said stem and tending to raise the same, said cam having a flattened portion which engages with the stem to hold the valve in closed position, and being formed so that when the flattened portion is moved out of engagement with the stem, the spring will throw the cam and open the valve.

3. The combination of a valve body having a seat therein, a disk, a stem for said disk, a removable top engaging with said body and having a passageway for said stem, a packing around said stem, an extension from said top having a bearing at its upper end for the stem, a spring engaging with said top and the stem, tending to raise the stem, a cam pivotally mounted in said extension and serving to move the stem downwardly to close the valve, and a handle for said cam.

4. The combination of a valve body having a seat therein, a top for said body also having a seat thereon, a disk adapted to engage with said seats when in closed and open positions respectively, a stem engaging with said disk and passing through said top, a packing in said top for said stem, a rotatable bearing member connected with said top and engaging with the stem at its outer end, an enlarged extension on the outer end of said stem, a spring between said extension and the top tending to open the valve, a cam pivoted in said bearing member, and a handle for said cam whereby the cam may be turned to press the stem downwardly to close the valve and lock it in closed position.

5. In a valve, the combination of a casing having inlet and outlet apertures, a valve seat around the outlet aperture, a valve disk adapted to engage with said seat, a valve stem extending out through the casing, a tension device for engagement with said casing and stem, tending to raise the stem to open the valve, a rotatable extension projecting upwardly from the casing, bearings in the casing and in said extension for the stem, a cam pivoted in said extension above the rod and engaging therewith, said cam having a flattened portion to enable the rod to be locked to hold the valve in closed position, and a handle for said cam.

JOSEPH H. HEDMARK.

Witnesses:
IRENE FORREST,
LEE J. PITNER.